United States Patent
Friedman et al.

(10) Patent No.: US 7,351,462 B2
(45) Date of Patent: *Apr. 1, 2008

(54) SYNTHETIC ROOFING SHINGLE OR TILE

(75) Inventors: Michael L. Friedman, Wayne, NJ (US); Husnu M. Kalkanoglu, Swarthmore, PA (US); Joong Youn Kim, Newtown Square, PA (US); Thomas Kevin MacKinnon, Ann Arbor, MI (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/531,788

(22) Filed: Sep. 14, 2006

(65) Prior Publication Data

US 2007/0022692 A1    Feb. 1, 2007

Related U.S. Application Data

(63) Continuation of application No. 10/452,059, filed on Jun. 2, 2003.

(51) Int. Cl.
*B32B 3/02*    (2006.01)
(52) U.S. Cl. .................... 428/68; 428/515; 428/516; 428/518; 428/520; 52/518; 52/745.19
(58) Field of Classification Search .......... 52/518, 52/745.19; 428/68, 515, 516, 518, 520
See application file for complete search history.

(56) References Cited

U.S. PATENT DOCUMENTS

| | | |
|---|---|---|
| 3,669,918 A | 6/1972 | Raley, Jr. |
| 3,741,856 A | 6/1973 | Hurst et al. |
| 3,900,102 A | 8/1975 | Hurst |
| 4,220,681 A | 9/1980 | Narita |
| 4,332,703 A | 6/1982 | Lijzenga et al. |
| 4,396,665 A | 8/1983 | Rowe |
| 4,404,960 A | 9/1983 | Laing |
| 4,856,975 A | 8/1989 | Gearhart |
| 4,983,247 A | 1/1991 | Kim |
| 5,022,381 A | 6/1991 | Allegro |
| 5,306,548 A | 4/1994 | Zabrocki et al. |
| 5,415,921 A | 5/1995 | Grohman |
| 5,482,667 A | 1/1996 | Dunton et al. |
| 5,571,581 A | 11/1996 | Koizumi et al. |

(Continued)

FOREIGN PATENT DOCUMENTS

CA    1008738    10/1973

(Continued)

OTHER PUBLICATIONS

Barrington Slate Tile Author unknown Date Apr. 18, 2007 Date available if prior art: unknow.

(Continued)

*Primary Examiner*—Chi Q. Nguyen
(74) *Attorney, Agent, or Firm*—Paul & Paul

(57) ABSTRACT

A synthetic roofing shingle or tile is provided, in which a core material is formed, of generally less expensive material, and with a skin material provided, disposed on a plurality of surfaces of the shingle or tile, with the skin material being generally of greater expense and having desirable weather-withstanding qualities.

20 Claims, 1 Drawing Sheet

U.S. PATENT DOCUMENTS

| | | | |
|---|---|---|---|
| 5,615,523 | A | 4/1997 | Wells et al. |
| 5,630,305 | A * | 5/1997 | Hlasnicek .................... 52/518 |
| 6,112,492 | A | 9/2000 | Wells et al. |
| 6,303,224 | B1 | 10/2001 | Krahn et al. |
| 6,349,961 | B1 | 2/2002 | Colley et al. |
| 6,368,093 | B1 | 4/2002 | Vecchiarino et al. |
| 6,440,524 | B2 | 8/2002 | Valyi et al. |
| 6,536,177 | B1 | 3/2003 | Italiane et al. |
| 6,808,785 | B1 * | 10/2004 | Friedman et al. ............. 428/68 |
| 2004/0241476 | A1 * | 12/2004 | Friedman et al. ........... 428/515 |

OTHER PUBLICATIONS

Barrington Slate Tile Statement with Analysis (13 pgs).

The Roofing Collection Re: Mira Vista Shingles Date Apr. 17, 2007 Believed to be subject of U.S. patents 5,615,523 and 6,112,432, which appear to not have a capstock layer, (3 pgs).

Mira Vista Shake Shingles Date Apr. 27, 2007 Believed to be the subject of U.S. patents 5,615,523 and 6,112,432, which appear to not have a capstock layer.

ES report ER-5209 (3 pgs) Reissued Apr. 1, 2002. Believed to be the subject of U.S. patents 5,615,523 and 6,112,423, which appear to not have a capstock layer.

Mira Vista Shake and Slate Application Instructions Publication No. 15-RR-44159 Believed to be the subject of U.S. patents 5,615,523 and 6,112,432, which appear to not have a capstock layer.

* cited by examiner

SYNTHETIC ROOFING SHINGLE OR TILE

CROSS-REFERENCE TO RELATED APPLICATIONS

This application is a continuation of U.S. Ser. No. 10/452,059 filed Jun. 2, 2003.

BACKGROUND OF THE INVENTION

In the art of making roofing shingles and tiles for exterior application in the building industry, such products are made by compression molding of multi-component formulations, which comprise blends of virgin and recycled polymers and various low cost fillers.

In order to achieve low production costs, it is commonplace for manufacturers to use inexpensive raw materials, such as recycled resin of low quality with a very large amount of inexpensive filler derived from various waste streams. Such filler can include carbon black, recycled rubber tire crumb, coal fines, pulp and paper waste, and other inexpensive materials.

The use of large quantities of such fillers reduces the mechanical properties of the ultimate product, however. Additionally, the use of such large quantities of fillers limits the color variations that are possible in the products and makes the processing of the formulations into shingles and other exterior application building products very difficult.

Typically, roofing shingles and tiles made of such material having waste for filler do not provide good weather resistance for the products. Additionally, the warranty periods that can reasonable be provided for such products tend to be short in duration.

Furthermore, such building industry roofing products have relatively low impact strength, especially at low temperatures. Insofar as their available colors are concerned, such tend to be limited to the colors gray and black.

SUMMARY OF THE INVENTION

The present invention is aimed at providing for synthetic fabrication of roofing shingles or tiles for exterior application which are free of the above-mentioned deficiencies of the prior art.

The present invention involves a roofing shingle or tile for exterior application in the building industry, of synthetic material, comprising a core of inexpensive material weather-exposed portions of which are encapsulated by a skin of a different material, preferably of a polymer having high weather resistance and the ability to be colored in various colors. The core material will generally be of greater thickness than that of the skin material.

The skin material is melted and molded in some manner, and cools and solidifies, and the less expensive but greater volume of molten core material is also molded, but is disposed inside the skin and both are allowed to cool and solidify, such that a core of less expensive material has weather-exposed portions or surfaces encapsulated by a skin of greater quality, having high weather resistance, color acceptance, and other beneficial features, such as good impact resistance, longer lifetime warranty capability and, optionally, various surface design configurations.

The skin and core materials can be co-injected into the same mold cavity. Alternatively, the skin material and core material can be co-extruded from melted ingredients contained within different cavities of a mold, so that the skin material encapsulates surfaces of the core material such that the skin material and core material are laminated together. Also, alternatively, the core material and skin material can each be compression molded and laminated together. Other alternative processes include co-extrusion followed by stamping or embossing, blow molding of the skin and core materials, or rotational or sequential molding.

Regardless of the method of making the composite skin-and-core roofing product, three dimensional relief can be built into the mold cavity configuration or applied in a post-molding stamping or embossing operation to be present in the skin, in order to simulate various natural materials such as wood shakes, tile, slate. etc.

Accordingly, it is an object of this invention to provide a multi-layer molded synthetic roofing shingle or tile, wherein a high quality thermoplastic skin layer of material encapsulates a plurality of surfaces of a lesser quality thermoplastic core layer of material, wherein each layer includes filler material to reduce material cost.

It is a further object of this invention to accomplish the above object, wherein the core material for the product is essentially a waste or recycled material.

It is a further object of this invention to accomplish the above objects, wherein the core material comprises the greater amount of material used in making the roofing shingle or tile.

Other objects and advantages of the present invention will be apparent from a reading from the following brief descriptions of the drawing figures, the detailed descriptions of the preferred embodiments, and the appended claims.

BRIEF DESCRIPTIONS OF THE DRAWING FIGURES

DETAILED DESCRIPTIONS OF THE PREFERRED EMBODIMENT

Figure 1:
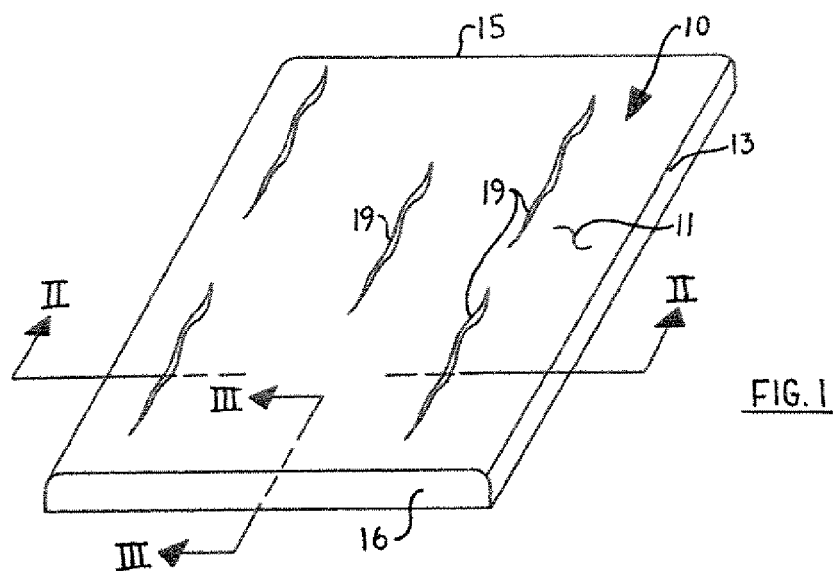
FIG. 1 is a top perspective view of synthetic roofing shingle or tile in accordance with this invention.

Referring now to the drawings in detail, reference is first made to FIG. 1, wherein a roofing shingle or tile 10 is illustrated, in the form of synthetic roofing shingle or tile. Such article 10 is typically illustrated as having upper and lower surfaces 11 and 12, right and left edge surfaces 13 and 14, and top and bottom edge surfaces 15 and 16. The article 10 may take on various other configurations as may be desired, other than the flat configuration shown. Typically, if it is to be made in the form of a tile, it may be flat or it may have a rounded or arched configuration. One or more ends such as that 16 may be of various other configurations, such as segmented, scalloped or the like, all as may be desired. One or more surfaces 11 may have lines, grooves or seemingly random relief areas 19, all as may be desired, for example to give the appearance of natural material, such as a cedar shingle, tile, slate, etc.

In general, the configurations of the various surfaces of the roofing shingle or tile 10 are unlimited as are the sizes of the same.

Figure 2:
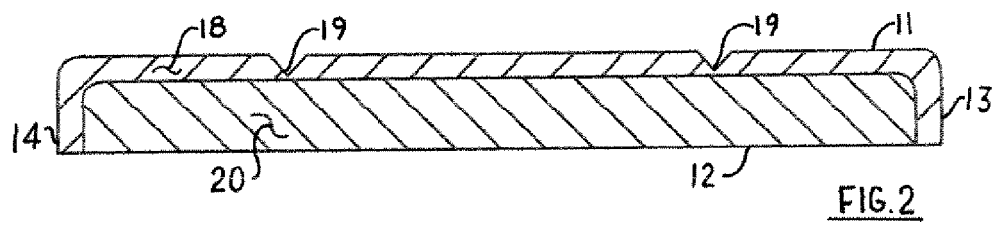
FIG. 2 is a transverse sectional view taken through the illustration of FIG. 1, generally along line II-II of FIG. 1, wherein the skin material is shown encapsulating the top surface and side edge surface of the core of the article illustrated in FIG. 1.
Figure 3:
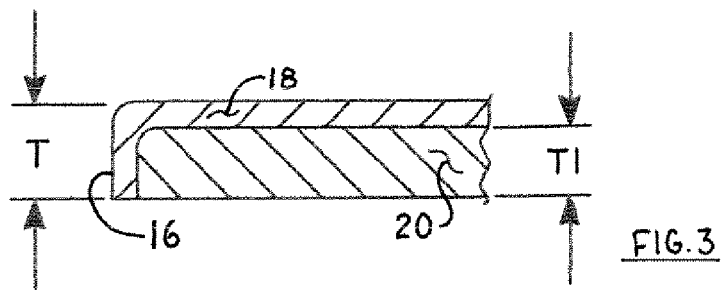
FIG. 3 is a fragmentary longitudinal sectional view taken through the illustration of FIG. 1, generally along the line III-III of FIG. 1, wherein the skin material is shown encapsulating the top surface and lower edge surface of the core of the article illustrated in FIG. 1.

With reference to FIG. 2, it will be seen that the article 10 is comprised of a skin 18 and a core 20, with the skin 18 encapsulating the top surface 21 of the core and forming encapsulating surfaces 13, 14 and 16 of the edges that would be weather-exposed.

Figure 4:
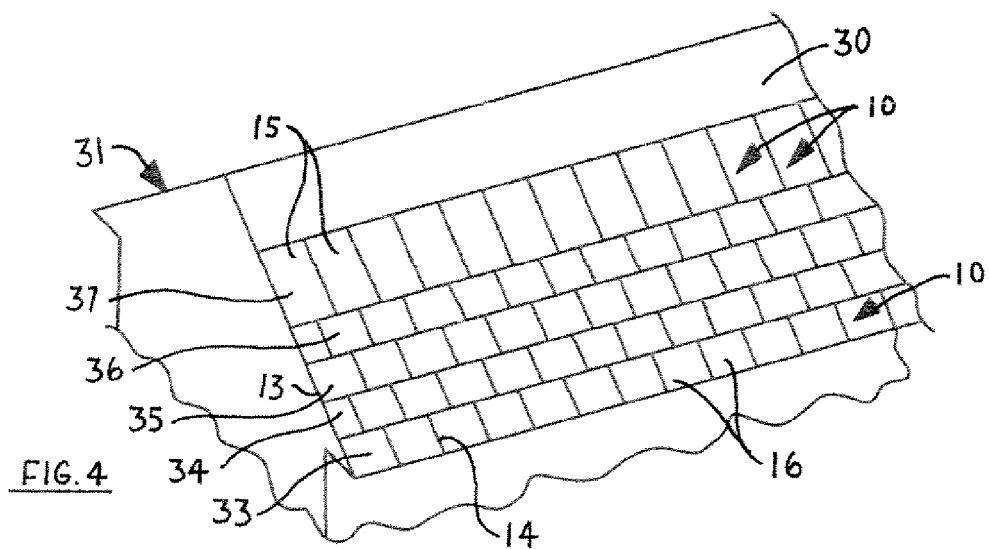
FIG. 4 is a perspective view of a roof, partially covered by a plurality of shingles made in accordance with the shingles of FIGS. 1-3.

In FIG. 4, a plurality of shingles or tiles 10 are shown applied as a roof covering 32 to a roof 30 of a structure 31 with lower surfaces 12 being disposed against the roof surface 30 and therefore being not weather-exposed and therefore not needing a protective skin material 18 encapsulating surfaces 12. Top edges 15 are likewise not weather-exposed because of next-overlying shingles covering such edges 15, so skin-encapsulation is not necessary. Right, left and especially bottom edge surfaces 13, 14 and 16, respectively, are weather-exposed and are therefore skin-encapsulated.

The roof covering 32 as shown in FIG. 4 is seen to comprise a plurality of roofing elements 10, toward the bottom of the roof 30, laid up side by side to form a lower course 33, with the next-overlying course 34 of such elements partially covering the roofing elements in the underlying course 33, with a next overlying course 35 of such elements likewise partially covering the roofing elements in the underlying course 34, followed by a next-overlying course 36 partially covering roofing elements in the next-underlying course 35, and with a next-overlying course 37 of elements partially covering the roofing elements in the next-underlying course 36 of elements. Each of the elements 10, comprising shingles or tiles, in each course are shown to be laid-up side-by-side, in FIG. 4. It will thus be seen that the process by which the various courses are applied in FIG. 4, are such that a lower-most course is first applied, followed by the application of a next-overlying course, with succeeding courses being applied partially covering next-underlying courses, in manner shown in FIG. 4 as the various courses are applied to form a roof covering 32.

The core material 20 will generally be of greater thickness "T1" than the skin material 18 and will preferably be comprised of a highly filled polymer. The skin material 18 will preferably be comprised of a polymer having high weather resistance and the ability to be colored in various colors as may be demanded by building designers.

By combining a skin material 18 with a core material 20, such allows an economic advantage in that a greater amount of filler may be used to comprise the core 20, which will be of less expense than the material that comprises the skin, without providing undesirable surface properties for the skin, and without limiting the aesthetics of the product, because the core 20 is encapsulated in an aesthetically pleasing and weatherable skin 18. Additionally, the core 20 can be comprised of a foam material where reduced weight for the product is desired.

In some embodiments the shingle or tile is comprised of a core 20 that is made of a low molecular weight material such as polypropylene filled with 40-80% by weight of recycled ash with suitable functional additives, encapsulated in a skin 18 comprised of a film.

Such fillers as core material can vary considerably and can be chosen from a group that includes treated and untreated ashes from incinerators of power stations, mineral fillers and their waste, pulp and paper waste materials, oil shale, reclaimed acrylic automotive paint and its waste and/or mixtures of any of these.

The skin can be chemically cross-linked to increase its mechanical properties and weather resistance and/or flame resistance and can contain functional additives such as pigments, UV light stabilizers and absorbers, sensibilizers (photo-initiators), etc. The cross linking may occur during or after processing of the material.

By way of example, the skin material 18 is selected from a group of thermoplastic materials comprising Polyolefins such as Polyethylene (PE), Polypropylene (PP), Polymethylpentene (PMP) and Polybutene (PB-1), their copolymers, blends, and filled formulations, other polymers having high weather resistance such as Polyacrylates and/or their copolymers blends and filled formulations. The skin material is preferably stabilized for UV-light and weathering resistance by using additives and additive packages known in the state-of-the-art to be efficient. In addition, the skin materials may also contain various additives such as thermal and UV-light stabilizers, pigments, compatibilizers, processing aids, flame retardant additives, and other functional chemicals capable of improving processing of the materials and performance of the product. Foaming agents such as azodicarbonamide may be used to reduce the density of the skin material. Such polymers, with one or more additives, are therefore polymeric materials.

By way of example, the core material 20 may be selected from the group comprising of virgin thermoplastic polymer materials and elastomers and rubber including but not limited to Polyvinylchloride (PVC), Polyethylene (PE), Polypropylene (PP), Polybutene (PB-1) Polymethylpentene (PMP), Polyacrylates (PAC), Polyethyleneterephthalate (PET), Polybutyleneterephthalate (PBT), Polyethylenenaphthalate (PEN), Ethylene-Propylene-Diene Monomer Copolymers (EPDM), their copolymers, binary and ternary blends of the above, and filled formulations based on the above and other thermoplastic materials and elastomers with mineral, organic fillers, nanofillers, reinforcing fillers and fibers as well as recycled materials of the above polymers. Such polymers, with one or more additives, are therefore polymeric materials.

From the costs point of view, recycled and highly filled thermoplastic materials and recycled rubber (for example from tires) are preferable. The content of mineral fillers can be in the weight range from 5% to 80%.

In addition, the core materials may also contain various additives such as thermal and ultraviolet (UV) light stabilizers, pigments, compatibilizers, processing aids, flame retardant additives, and other functional chemicals capable of improving processing of the materials and performance of the product. Foaming agents such as azodicarbonamide may be used to reduce the density of the core material.

As indicated above, the skin 18 may, if desired, be embossed or stamped after the material is processed and the item is shaped, or the same may be molded to have relief portions to simulate embossing or stamping during the molding process.

In making the products of this invention, the combined upper and lower layers 11 and 12, of the skin 18 may comprise from 1% to 40% of the total thickness of the product, with the core 20 inside the skin 18 being thicker between surfaces 11 and 12 and comprising the remaining percentage of the total thickness "T" of the product.

It will be apparent from the foregoing that various other modifications may be made in the details of making the roofing shingle or tile of this invention, all within the spirit and scope of the invention as defined in the appended claims.

What is claimed is:

1. A synthetic roofing element of the shingle or tile type, for exterior application comprising a multi-layer structure having:
   (a) a skin including a first thermoplastic material;
   (b) a core including a second thermoplastic material;
   (c) wherein the first material is a highly weather resistant polymeric material relative to the second material;
   (d) wherein the second material is a polymeric material having filler therein and;
   (e) wherein the core is comprised of a substantially greater volume of second material than the volume of first material that comprises the skin; and
   (f) wherein the skin encapsulates a plurality of surfaces of the core.

2. The synthetic roofing element of claim 1, wherein the skin includes at least one surface having three-dimensional relief therein, simulating a natural material comprising any one of:
   (i) wood shake;
   (ii) tile; and
   (iii) slate.

3. The roofing element of claim 2, wherein the skin of the roofing element encapsulates a surface of the roofing element that would be weather-exposed in the installed condition of the roofing element on a roof.

4. The roofing element of claim 2, wherein each of the skin and core are constructed of once molten, solidified material.

5. The roofing element of claim 2, wherein the polymer of the first material is selected from the group consisting of:
   (a) Polyethylene;
   (b) Polypropylene;
   (c) Polymethylpentene;
   (d) Polybutene;
   (e) Polyacrylates; and
   (f) copolymers and/or blends of any of (a) through (e).

6. The roofing element of claim 2, wherein the polymer of the second material is selected from the group consisting of:
   (a) Polyvinylchloride;
   (b) Polyethylene;
   (c) Polypropylene;
   (d) Polybutene;
   (e) Polymethylpentene;
   (f) Polyacrylates;
   (g) Polyethyleneterephthalate;
   (h) Polybutyleneterephthalate;
   (i) Polyethylenenaphthalate;
   (j) Ethylene-Propylene-Diene Monomer Copolymers; and
   (k) copolymers and/or binary or ternary blends of any of (a) through (j) above.

7. The roofing element of claim 2, wherein the filler of the second material is selected from the group consisting of:
   (a) mineral filler;
   (b) organic filler;
   (c) nanofiller;
   (d) reinforcing filler;
   (e) reinforcing fiber;
   (f) recycled polymer of any of;
      (i) Polyvinylchloride;
      (ii) Polyethylene;
      (iii) Polypropylene;
      (iv) Polybutene;
      (v) Polymethylpentene;
      (vi) Polyacrylates;
      (vii) Polyethyleneterephthalate;
      (viii) Polybutyleneterephthalate;
      (ix) Polyethylenenaphthalate;
      (x) Ethylene-Propylene-Diene Monomer Copolymers; and
      (xi) copolymers and/or binary or ternary blends or any combinations of any of (i) through (x) above.

8. The roofing element of claim 2, wherein the first material includes at least one additive therein, with said additive(s) being selected from the group consisting of:
   (a) thermal stabilizers;
   (b) ultraviolet light stabilizers;
   (c) pigments;
   (d) compatibilizer(s);
   (e) flame retardants; and
   (f) processing aids.

9. The roofing element of claim 2, wherein the second material includes at least one additive therein, with said additive(s) being selected from the group consisting of:
   (a) thermal stabilizers;
   (b) ultraviolet light stabilizers;
   (c) pigments;
   (d) compatibilizer(s);
   (e) flame retardants; and
   (f) processing aids.

10. A roof covering comprising a plurality of synthetic roofing elements applied to a roof, side by side, forming a plurality of courses, with roofing elements in given courses comprising underlying courses and having other courses comprising next-overlying courses partially covering the roofing elements in an underlying course, with each roofing element being of the shingle or tile type for exterior application comprising a multi-layer structure having:
    (a) a skin including a first thermoplastic material;
    (b) a core including a second thermoplastic material;
    (c) wherein the first material is a highly weather resistant polymeric material relative to the second material;
    (d) wherein the second material is a polymeric material having filler therein and;
    (e) wherein the core is comprised of a substantially greater volume of second material than the volume of first material that comprises the skin;
    (f) wherein the skin encapsulates a plurality of surfaces of the core.

11. The roof covering of claim 10, wherein the skins include surfaces having three-dimensional relief therein, simulating natural materials, comprising any one of:
    (i) wood shake;
    (ii) tile; and
    (iii) slate.

12. The roof covering of claim 11, wherein the skins of the roofing elements encapsulate surfaces of the roofing elements that would be weather-exposed in the installed condition of the roofing elements on a roof.

13. The roof covering of claim 11, wherein each of the skin and core of the roofing elements are constructed of once molten, solidified material.

14. The roof covering of claim 11, wherein the polymer of the first material is selected from the group consisting of:
    (a) Polyethylene;
    (b) Polypropylene;
    (c) Polymethylpentene;
    (d) Polybutene;
    (e) Polyacrylates; and
    (f) copolymers and/or blends of any of (a) through (e).

15. The roof covering of claim 11, wherein the polymer of the second material is selected from the group consisting of:
(a) Polyvinylchloride;
(b) Polyethylene;
(c) Polypropylene;
(d) Polybutene;
(e) Polymethylpentene;
(f) Polyacrylates;
(g) Polyethyleneterephthalate;
(h) Polybutyleneterephthalate;
(i) Polyethylenenaphthalate;
(j) Ethylene-Propylene-Diene Monomer Copolymers; and
(k) copolymers and/or binary or ternary blends of any of (a) through (j) above.

16. The roof covering of claim 11, wherein the filler of the second material is selected from the group consisting of:
(a) mineral filler;
(b) organic filler;
(c) nanofiller;
(d) reinforcing filler;
(e) reinforcing fiber;
(f) recycled polymer of any of;
  (i) Polyvinylchloride;
  (ii) Polyethylene;
  (iii) Polypropylene;
  (iv) Polybutene;
  (v) Polymethylpentene;
  (vi) Polyacrylates;
  (vii) Polyethyleneterephthalate;
  (viii) Polybutyleneterephthalate;
  (ix) Polyethylenenaphthalate;
  (x) Ethylene-Propylene-Diene Monomer Copolymers; and
  (xi) copolymers and/or binary or ternary blends or any combinations of any of (i) through (x) above.

17. The roof covering of claim 11, wherein the first material includes at least one additive therein, with said additive(s) being selected from the group consisting of:
(a) thermal stabilizers;
(b) ultraviolet light stabilizers;
(c) pigments;
(d) compatibilizer(s);
(e) flame retardants; and
(f) processing aids.

18. The roof covering of claim 11, wherein the second material includes at least one additive therein, with said additive(s) being selected from the group consisting of:
(a) thermal stabilizers;
(b) ultraviolet light stabilizers;
(c) pigments;
(d) compatibilizer(s);
(e) flame retardants; and
(f) processing aids.

19. A method of covering a roof comprising providing a plurality of roofing elements and applying them to a roof, side by side, in courses, and placing them such that the roofing elements in a given course comprise an underlying course, then providing another course that comprises a next-overlying course partially covering the roofing elements in the underlying course, then successively applying additional courses, such that roofing elements in each next-overlying course partially cover roofing elements in a next-underlying course, and wherein the step of providing roofing elements comprises providing synthetic roofing elements of the shingle or tile type for exterior application; and wherein the step of providing roofing elements also includes providing the roofing elements in the form of multi-layer structures, each structure having:
(a) a skin including a first thermoplastic material;
(b) a core including a second thermoplastic material;
(c) wherein the first material is a highly weather resistant polymeric material relative to the second material;
(d) wherein the second material is a polymeric material having filler therein and;
(e) wherein the core is comprised of a substantially greater volume of second material than the volume of first material that comprises the skin;
(f) wherein the skin encapsulates a plurality of surfaces of the core; and
(g) wherein the skin includes at least one surface having three-dimensional relief therein, simulating a natural material, comprising any one of:
  (i) wood shake;
  (ii) tile; and
  (iii) slate.

20. The method of claim 19, including the steps of providing each of the skin and core materials in molten form and then solidifying the skin and core materials.

* * * * *